United States Patent
Thomas et al.

(10) Patent No.: US 11,422,568 B1
(45) Date of Patent: Aug. 23, 2022

(54) SYSTEM TO FACILITATE USER AUTHENTICATION BY AUTONOMOUS MOBILE DEVICE

(71) Applicant: AMAZON TECHNOLOGIES, INC., Seattle, WA (US)

(72) Inventors: Jim Oommen Thomas, Kenmore, WA (US); Jingjing Zheng, Bellevue, WA (US); Rakesh Ramesh, San Jose, CA (US); Yuyin Sun, Seattle, WA (US); Lu Xia, Bellevue, WA (US); Peng Lei, Redmond, WA (US); Jiajia Luo, Sammamish, WA (US)

(73) Assignee: AMAZON TECHNOLGOIES, INC., Seattle, WA (US)

( * ) Notice: Subject to any disclaimer, the term of this patent is extended or adjusted under 35 U.S.C. 154(b) by 250 days.

(21) Appl. No.: 16/680,227

(22) Filed: Nov. 11, 2019

(51) Int. Cl.
| | |
|---|---|
| *G05D 1/02* | (2020.01) |
| *G05D 1/08* | (2006.01) |
| *G06F 21/32* | (2013.01) |
| *G05D 1/00* | (2006.01) |
| *G06V 40/16* | (2022.01) |

(52) U.S. Cl.
CPC ......... *G05D 1/0246* (2013.01); *G05D 1/0088* (2013.01); *G05D 1/0274* (2013.01); *G05D 1/08* (2013.01); *G06F 21/32* (2013.01); *G06V 40/172* (2022.01)

(58) Field of Classification Search
CPC ........ G05D 1/0246; A61B 5/107; G06K 9/00; H04N 5/23; G09B 5/14; G10L 17/02; G10L 21/028; B25J 11/008; B25J 19/021; B25J 13/003; H04R 1/028
See application file for complete search history.

(56) References Cited

U.S. PATENT DOCUMENTS

| | | | | |
|---|---|---|---|---|
| 9,259,842 | B2 * | 2/2016 | Fouillade | B25J 13/003 |
| 2009/0030552 | A1 * | 1/2009 | Nakadai | G10L 21/028 |
| | | | | 700/258 |
| 2018/0056519 | A1 * | 3/2018 | Ogawa | B25J 19/021 |
| 2019/0297412 | A1 * | 9/2019 | Hentunen | H04R 1/028 |
| 2020/0122333 | A1 * | 4/2020 | Park | B25J 11/008 |

FOREIGN PATENT DOCUMENTS

| | | | | | |
|---|---|---|---|---|---|
| CN | 105718921 | A | * | 6/2016 | G06K 9/00 |
| CN | 107657852 | A | * | 2/2018 | G06K 9/00 |
| CN | 108124090 | A | * | 6/2018 | G06K 9/00 |
| JP | 2018089161 | A | * | 6/2018 | A61B 5/107 |

* cited by examiner

Primary Examiner — Yuri Kan
(74) Attorney, Agent, or Firm — Lindauer Law, PLLC

(57) ABSTRACT

An autonomous mobile device (AMD) may perform various tasks during operation. Some tasks, such as delivering a message to a particular user, may involve the AMD identifying the particular user. The AMD includes a camera to acquire an image, and image-based authentication techniques are used to determine a user's identity. A user may move within in a physical space, and the space may contain various obstructions which may occlude images. The AMD may move within the space to obtain a vantage point from which an image of the face of the user is obtained which is suitable for image-based authentication. In some situations, the AMD may present an attention signal, such as playing a sound from a speaker or flashing a light, to encourage the user to look at the AMD, providing an image for use in image-based authentication.

20 Claims, 10 Drawing Sheets

SYSTEM TO FACILITATE USER AUTHENTICATION BY AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
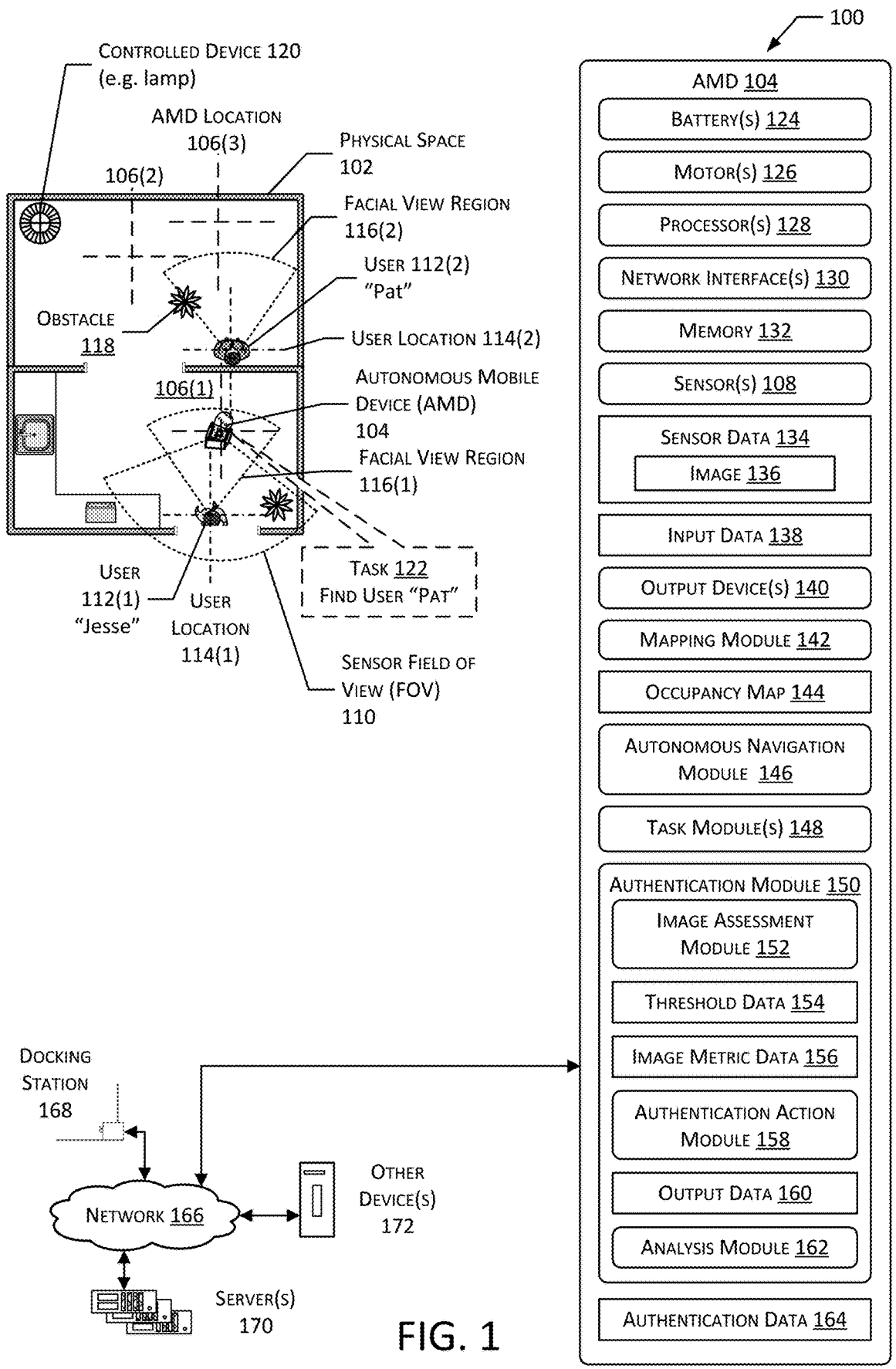
FIG. 1 illustrates a system that includes an autonomous mobile device (AMD) that facilitates authentication of a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The physical space may be divided into regions. For example, each room or area associated with a particular function may be designated as a region.

The AMD may perform tasks that involve moving within the physical space. These tasks may also include interacting with users in the physical space. Some of these tasks or other operations by the AMD may involve authenticating a user. For example, the AMD may be commanded to deliver a message to a user, which may involve the AMD attempting to authenticate people in the environment in order to find the user. Once the user has been found and identified, the message could then be delivered by the AMD.

Sensors on the AMD or in the physical space acquire sensor data. The sensor data is processed to determine information such as the current location of the AMD in the physical space, identity of a user, and so forth. The sensors may include a camera on the AMD that acquires images of the physical space. The camera has a field of view (FOV). One or more images are processed to determine if a person is depicted in the image, and if so to authenticate the person. For example, one or more neural networks may be used to determine if a person is present in the image, to authenticate a previously enrolled or identified user, and so forth. Other techniques may also be used to authenticate a user in conjunction with, or instead of processing an image of the user's face. For example, the speech of the user may be processed to determine an identity of the person speaking.

Overall performance of an authentication system is significantly improved if the depiction of the user's face in the acquired image satisfies various conditions. For example, image-based authentication may be most reliable when the portion of the image with the user's face is greater than a certain size, lighting and camera exposure makes features on the face visible, and the user's face is directed at the camera. If any one or more of these conditions are beyond a threshold range, authentication becomes unreliable or may fail entirely. Continuing the example, if the apparent size of the user's face in the image is less than a threshold size due to being too far away from the camera, there are not enough features visible to provide a reliable authentication. In another example, if the face is not illuminated by a wavelength of light that the camera is sensitive to, no features are visible to recognize. In yet another example, if the user is looking away from the camera, too few features are visible.

Traditionally systems for acquiring images to perform image-based authentication are passive in that they acquire images from a fixed camera and process those images in an attempt to recognize a user. Such passive systems may require that the user be trained to perform certain actions, such as maintaining their face at a particular distance from a camera, maintaining a particular orientation of the user's head with respect to the camera, and so forth. In a dynamic environment, such as a home, passive systems introduce constraints on usage that adversely impact the user experience. For example, a user may find it annoying to have to assume a particular position with respect to a robot every time the user issues a command. In another example, the user may be engaged in another task which does not allow the assumption of that particular position. For example, a user who is engaged in conversation may not want to be interrupted to turn and face a robot to provide a suitable image for image-based authentication.

Described in this disclosure are techniques for the AMD to actively facilitate image-based authentication. The AMD processes an acquired image to determine if the image is suitable for image-based authentication. If the image is not suitable for image-based authentication, the AMD will perform one or more actions to facilitate image-based authentication.

An image is acquired by a camera on the AMD. Image metric data associated with the image is determined. The image metric data may be compared to one or more thresholds to determine if the image is suitable for image-based authentication.

The image metric data may include information indicative of exposure. For example, intensities of pixels in the image may be used to determine if the image is under- or over-exposed.

The image metric data may include one or more bounding boxes. A bounding box specifies a portion of an image. In one implementation, a neural network may be trained to determine a body bounding box around a body of a person as depicted in the image. A body confidence value may also be determined, indicative of the likelihood that the body bounding box contains a depiction of a body. The same or a different neural network may be used to determine a face bounding box around a face as depicted in the image. A face confidence value may also be determined, indicative of the likelihood that the face bounding box contains a depiction of a face.

The one or more neural networks may also provide as output information such as a visibility score associated with a bounding box. For example, the one or more neural networks may be trained to determine facial features within the bounding box. The visibility score may be indicative of the facial features. For example, the visibility score may be based on a count of the facial features in the bounding box, a density of the facial features with respect to the area of the bounding box, confidence values of determination of the individual features, and so forth. The visibility score may be used to assess an image in particular with respect to whether the face is occluded. If the visibility score of a first image is less than a threshold value, the first image may be deemed unsuitable for use and a second image may be acquired.

The image metric data may include other information, such as size or area of the bounding boxes. For example, an area of a bounding box may be determined by multiplying a width in pixels of the bounding box by a height in pixels of the bounding box. While bounding boxes are described as being rectangular, in other implementations other shapes may be used. For example, a bounding circle or an irregular shape may be used.

The one or more bounding boxes indicated by the image metric data may be assessed to determine if an image is suitable for image-based authentication. A size of a face bounding box may be determined. If that size is less than a threshold size value, the first image may be deemed unsuitable. For example, image-based authentication may fail if the user is so far away from the camera that the apparent size of their face in the first image is too small to provide enough information to authenticate the user.

The image metric data may include face pose data that is indicative of a face pose in the image. In one implementation, the face pose data may be indicative of one or more of yaw, pitch, or roll of the face relative to the camera. In another implementation, the face pose data may be indicative of a relative pose such as "oriented left", "oriented right", "oriented up", "oriented down", or "towards camera".

The image metric data may include information that is based on information external to the image. For example, the AMD may determine an occupancy map indicative of the locations of obstacles in the physical space. The AMD may determine a first location as to where the camera was when the image was acquired and a second location as to where a user is. The occupancy map may be used to determine if there is an obstacle present along a straight line between the first location and the second location. The image metric data may be indicative of whether a line of sight (LOS) between the first location and the second location includes an obstacle.

Information indicative of urgency of authentication may also be determined. For example, a task to find a user within a threshold period of time may be deemed to require an urgent authentication.

The image metric data may be used to determine if a first image is suitable for image-based authentication. If the first image is deemed suitable, the first image may then be processed to authenticate a user. If the first image is deemed unsuitable, the AMD may take one or more actions to try and acquire a second image that is deemed suitable for use for image-based authentication.

These actions may include sending instructions to control one or more controlled devices in the physical space, moving the AMD to another location in the physical space, presenting an output to get a person to look towards the AMD, and so forth.

In one implementation, a first image may be assessed to determine whether it is over- or under-exposed. If the first image is over-exposed the AMD may send a command to a controlled device, such as a light switch, to turn off a light in the physical space. If the image is under-exposed the AMD may send a command to the controlled device to increase overall illumination in the physical space by turning on a light. Other controlled devices may include electronic windows, electronically controlled window shades, and so forth. Once the illumination has been changed, a second image may be acquired. The image metric data for the second image may be determined. If the second image exhibits an exposure within a specified range, it may be further assessed to determine suitability for image-based authentication.

An action taken to facilitate image-based authentication includes moving the AMD to a second location where the second image may then be acquired. In one implementation, if the visibility score of the first image is less than a threshold value, the AMD may move to a second location to provide a different point of view of the user. In another implementation, if the size of the face bounding box is less than a threshold value the AMD may move to a second location that is closer to the user. In yet another implementation if an obstacle is determined to be between the user and the AMD, the AMD may move to a second location that provides an unobscured line of sight.

The AMD may move to a second location that affords an improved view of the user's face. The AMD may move to a second location that provides a point of view in which the apparent pose of the user's face in the second image is better suited for image-based authentication. For example, the user may be seated with their head turned to the right while the first location of the AMD is to the left of the user. From this first location, the camera on the AMD acquires a first image of the back of the user's head and the left ear. The AMD may then move to a second location that is to the right of the location of the user. From the second location, the camera on the AMD acquires a second image that depicts the user's entire face.

In some situations, the AMD may present one or more of an audible or visual output to attract attention. For example, the AMD may use speakers to present a sound, present a visual output on a display device, turn on a light, and so forth. The presentation of this output may attract the attention of a user in the physical space, causing them to turn their head and look toward the AMD.

In different situations various combinations of actions may be used. For example, if the AMD is performing a task that requires an urgent authentication it may present output to attract attention rather than taking the time to move to a second location. In another example, such as during hours designated as sleeping time, the AMD may avoid turning on the lights in the room.

By using the techniques described, the AMD is able to more quickly and accurately authenticate users based at least in part on image-based authentication. The AMD is able to determine whether an image is suitable for image-based authentication. If an unsuitable image is determined, the AMD may affirmatively take one or more actions to acquire a suitable image and authenticate the person. This improves the operational security of the system, facilitating control of access to information and functions to intended individuals.

The techniques described also improve the computational efficiency associated with performing image-based authentication. The system may be configured to discard unsuitable images and only provide suitable images for image-based authentication. As a result, operation of the image-based authentication system that would otherwise be involved in processing unsuitable images is reduced. This reduces the computational requirements as well as reducing power consumption, extending the battery life of the AMD. As a result, the operation of the AMD is significantly improved.

Illustrative System

FIG. 1 illustrates a system 100 in which a physical space 102 includes an autonomous mobile device (AMD) 104, according to some implementations. The AMD 104 may be present at an AMD location 106 within the physical space 102. For example, the AMD locations 106 may be indicative of a current location of the AMD 104, a candidate location that the AMD 104 could move to, and so forth.

The AMD 104 may include one or more sensors 108. For example, the sensors 108 may include cameras, microphones, and so forth. Individual sensors 108, such as a camera, may exhibit a sensor field of view (FOV) 110. For example, the sensor FOV 110 of a camera may be indicative of the portion of the physical space 102 that the camera is able to acquire an image of. The sensors 108 are discussed in more detail with regard to FIG. 3.

The physical space 102 may include one or more users 112. Each user 112 may be associated with a user location 114. The user locations 114 may be indicative of a current location of the user 112, an estimated location that the user 112 may move to at another time, and so forth.

A facial view region 116 may be associated with a user 112. The facial view region 116 may be described with respect to the head of the user 112. For example, the facial view region 116 may comprise a solid angle with the apex located at the mouth of the user 112. The facial view region 116 may comprise a volume in the physical space 102, with respect to the head of the user 112, from which an image acquired by a camera pointed at the face would exhibit a face pose suitable for use in image-based authentication. The face pose may comprise the orientation of the face of the user 112, with respect to the camera. For example, a face pose may be described as a rotation of the face with regard to one or more of a yaw axis, pitch axis, or roll axis.

The face pose in an acquired image may affect image-based authentication. For example, a neural network trained to recognize the face of a user 112 will fail if the image of the user 112 shows the back of the user's 112 head. In comparison, the neural network is most likely to successfully recognize a user 112 if their face pose presents the face within a threshold range of rotations along yaw, pitch, and roll axes.

In many implementations, the likelihood of successful image-based authentication occurs using images acquired when the camera of the AMD 104 is within the facial view region 116 of the user 112, and the user 112 is within the sensor FOV 110. However, the success of image-based authentication decreases if there is an obstruction between the AMD 104 and the user 112.

The physical space 102 may include obstacles 118. An obstacle 118 may comprise an object or feature that prevents or impairs traversal by the AMD 104. For example, an obstacle 118 may comprise a wall, stairwell, and so forth. Obstacles 118 may also impair a view between two locations. For example, a wall prevents the AMD 104 at the AMD location 106(1) from seeing the user 112(2) at the user location 114(2) in the next room. In another example, a plant or piece of furniture may block the view between two locations.

The physical space 102 may include controlled devices 120 such as network connected lights, light switches, audio devices, network connected televisions, home automation controls, security systems, and so forth. For example, the controlled devices 120 may include a network connected light switch allowing for remote operation of a light.

During operation, the AMD 104 may perform various tasks 122. These tasks 122 may be initiated by a user 112, by an internal process of the AMD 104, responsive to external input, and so forth. For example, in this illustration the AMD 104 is performing the task of finding user 112(2) "Pat". To find a particular user 112, the AMD 104 may move through the physical space 102, acquiring images using a camera. These images may be processed as described below to determine suitable images, and the suitable images may be processed using an image-based authentication system that attempts to authenticate the user 112 being sought.

The AMD 104 may include a battery(s) 124 to provide electrical power for operation of the AMD 104. The battery 124 may be rechargeable, allowing it to store electrical energy obtained from an external source. In other implementations a wireless power receiver may be used to provide power for operation of the AMD 104, recharge the battery 124, and so forth.

One or more motors 126 or other actuators enable the AMD 104 to move from one location in the physical space 102 to another. For example, a motor 126 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 may include one or more hardware processors 128 (processors) configured to execute one or more stored instructions. The processors 128 may comprise one or more cores. The processors 128 may include microcontrollers, systems on a chip, field programmable gate arrays, digital signal processors, graphic processing units, general processing units, and so forth.

The AMD 104 may include one or more network interfaces 130. The network interfaces 130 may include devices to connect to personal area networks (PANs), local area networks (LANs), wireless local area networks (WLANS), wide area networks (WANs), and so forth. For example, the network interfaces 130 may include devices compatible with Ethernet, Wi-Fi, Bluetooth, Bluetooth Low Energy, ZigBee, and so forth.

The AMD 104 includes one or more memories 132. The memory 132 may comprise one or more non-transitory computer-readable storage media (CRSM).

The AMD 104 may include one or more sensors 108. For example, the sensors 108 may include a camera as described above. The sensors 108 may generate sensor data 134. The sensor data 134 may include images 136 acquired by the camera. The sensors 108 are discussed in more detail with regard to FIG. 3.

During operation the AMD 104 may determine input data 138. The input data 138 may include or be based at least in part on sensor data 134 from the sensors 108 onboard the AMD 104. In one implementation, a speech processing module may process raw audio data obtained by a microphone on the AMD 104 and produce input data 138. For example, the user 112 may say "robot, come here" which may produce input data 138 "come here". In another implementation, the input data 138 may comprise information such as a command provided by another computing device, such as a smartphone or tablet computer.

The AMD 104 includes one or more output devices 140, such as one or more of a motor 126, light, speaker, display, projector, printer, and so forth. The one or more output devices 140 may be used to provide output during operation of the AMD 104. The output devices 140 are discussed in more detail with regard to FIG. 3.

The mapping module 142 determines an occupancy map 144 that represents the physical space 102 and the obstacles 118 and their locations in the physical space 102. During operation the mapping module 142 uses the sensor data 134 from various sensors 108 to determine information such as where the AMD 104 is, the presence of obstacles 118, where those obstacles 118 are, how far the AMD 104 has moved, and so forth.

The occupancy map 144 may comprise data that indicates the location of one or more obstacles 118, such as a table, wall, stairwell, and so forth. In some implementations, the occupancy map 144 may comprise a plurality of cells with each cell of the plurality of cells representing a particular area in the physical space 102. Data, such as occupancy values, may be stored that indicates whether an area of the physical space 102 associated with the cell is unobserved, occupied by an obstacle 118, or is unoccupied. An obstacle 118 may comprise an object or feature that prevents or impairs traversal by the AMD 104. For example, an obstacle 118 may comprise a wall, stairwell, and so forth.

The occupancy map 144 may be manually or automatically determined. For example, during a learning phase the user may take the AMD 104 on a tour of the physical space 102, allowing the mapping module 142 of the AMD 104 to determine the occupancy map 144. The user 112 may provide input data 138 such as tags designating a particular obstacle type, such as "furniture" or "fragile". In another example, during subsequent operation, the AMD 104 may generate the occupancy map 144 that is indicative of locations and types of obstacles such as chairs, doors, stairwells, and so forth as it moves unattended through the physical space 102.

Modules described herein, such as the mapping module 142, may provide various processing functions such as de-noising, filtering, and so forth. Processing of sensor data 134, such as an image 136 from a camera, may be performed by a module implementing, at least in part, one or more of the following tools or techniques. In one implementation, processing of an image may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 134. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 134 or other data. For example, the ANN may be trained using a supervised learning algorithm such that object identifiers are associated with images of particular objects within training images provided to the ANN. Once trained, the ANN may be provided with the sensor data 134 and produce output indicative of the object identifier.

An autonomous navigation module 146 provides the AMD 104 with the ability to navigate within the physical space 102 without real-time human interaction. The autonomous navigation module 146 may implement, or operate in conjunction with, the mapping module 142 to determine the occupancy map 144. The autonomous navigation module 146 is discussed in more detail with regard to FIG. 2.

The AMD 104 autonomous navigation module 146 may generate path plan data that is indicative of a path through the physical space 102 from the current location to a destination location. The AMD 104 may then begin moving along the path.

The AMD 104 may utilize one or more task modules 148 to perform a task 122. The task module 148 comprises instructions that, when executed, provide one or more functions. The task modules 148 may perform functions such as finding a user 112, following a user 112, present output on output devices 140 of the AMD 104, perform sentry tasks by moving the AMD 104 through the physical space 102 to determine the presence of unauthorized people, and so forth. Some tasks 122 may involve the authentication of a user 112. For example, a user 112 may be identified to determine if they have permission to order performance of a particular task 122. In another example, a user 112 may need to be identified as part of performance of a task 122, such as finding a particular user 112.

The AMD 104 may include an authentication module 150. The authentication module 150 may include an image assessment module 152. The image assessment module 152 may use threshold data 154 to determine if an image is suitable for subsequent image-based authentication. The image assessment module 152 may determine image metric data 156 for an image 136. One or more values of the image metric data 156 may be compared to thresholds specified by the threshold data 154 to determine whether the image 136 is suitable for image-based authentication.

The image metric data 156 may include data indicative of exposure of the image. For example, an exposure value may be calculated based on luminosity values of pixels in the image.

The image metric data 156 may be indicative of one or more portions of the regions that are determined to be associated with particular objects or portions thereof. For example, the image metric data 156 may include one or more bounding boxes. A body bounding box may designate a portion of the image that is determined to contain a body of a user 112. In some implementations a neural network may be used to determine the bounding box. A face bounding box may designate a portion of the image that is determined to contain a face. A bounding box may have an associated confidence value, indicative of a likelihood that the bounding box contains the object. Bounding boxes are described in more detail below with regard to FIGS. 4A-4C. The image metric data 156 may also include information such as one or more dimensions of a bounding box, area of a bounding box, and so forth.

The image metric data 156 may include a visibility score. In some implementations, the neural network(s) used to determine the bounding box(es) may also provide as output information such as a visibility score associated with the bounding box. The visibility score may be representative of features depicted within the bounding box, or keypoints. For example, the neural network may determine a number of keypoints that are associated with features depicted within the portion of the image designated by the bounding box. The visibility score may comprise a count of these keypoints, a density of the number of keypoints within a given area of the image, may be based on confidence values associated with determination of the features, and so forth. For example, the visibility score may comprise an average of the confidence values of keypoints in a bounding box.

The image metric data 156 may include face pose data that is indicative of a face pose in the image. In one implementation, the face pose data may be indicative of one or more of yaw, pitch, or roll of the face, relative to the camera. In another implementation, the face pose data may be indicative of a relative position such as "oriented left", "oriented right", "oriented up", "oriented down", or "towards camera".

The image metric data 156 may include information that is based on information external to the image, such as information associated with acquisition of the image. For example, the AMD 104 may determine a first AMD location 106 as to where the camera was when the image was acquired, and a first user location 114 as to where the user 112 is. The occupancy map 144 may be used to determine if there is an obstacle 118 present along a straight line between the first AMD location 106 and the first user location 114. The image metric data 156 may be indicative of whether a line of sight (LOS) between the two locations includes an obstacle 118.

The image assessment module 152 assesses the image metric data 156 based on the threshold data 154 to determine if a first image in the image 136 is suitable or not for image-based authentication. If the image is deemed to be unsuitable, an authentication action module 158 may perform one or more actions to attempt to obtain a second image. For example, the authentication action module 158 may generate output data 160 that is used to operate a controlled device 120, move the AMD 104, present output using the output device 140, and so forth. The functions provided by the image assessment module 152 and authentication action module 158 are discussed in more detail with regard to FIGS. 5A-5B.

An image that is deemed suitable for use is provided to an analysis module 162. The analysis module 162 may comprise one or more neural networks that determine and compare features from a set of enrolled or known users 112 with a face depicted in the image. For example, the analysis module 162 may use a convolutional neural network that accepts the image as input.

The authentication module 150 provides as output authentication data 164. For example, the authentication data 164 may comprise a user identifier indicative of a particular user 112 and a confidence value that the authentication is likely correct. In another example, the authentication data 164 may indicate that the user 112 is unknown. In yet another example, the authentication data 164 may indicate that the system is unable to perform an authentication. The authentication data 164 may then be used by other modules. For example, the task modules 148 may use the authentication data 164 to determine if a user 112 issuing a command is authorized to issue the command, determine whether a user 112 is permitted to be in the physical space 102, and so forth.

The AMD 104 may use the network interfaces 130 to connect to a network 166. For example, the network 166 may comprise a wireless local area network, that is connected to a wide area network such as the Internet.

The AMD 104 may be configured to dock or connect to a docking station 168. The docking station 168 may also be connected to the network 166. For example, the docking station 168 may be configured to connect to the wireless local area network 166 such that the docking station 168 and the AMD 104 may communicate. The docking station 168 may provide external power which the AMD 104 may use to charge the battery 124.

The AMD 104 may access one or more servers 170 via the network 166. For example, the AMD 104 may utilize a wakeword detection module to determine if the user 112 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 112 to one or more servers 170 for further processing. The servers 170 may process the spoken audio and return to the AMD 104 data that may be subsequently used to operate the AMD 104.

The AMD 104 may also communicate with other devices 172. The other devices 172 may include the controlled devices 120, or other devices. For example, the other devices 172 may include a doorbell camera, a garage door opener, a refrigerator, washing machine, and so forth. In some implementations the other devices 172 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
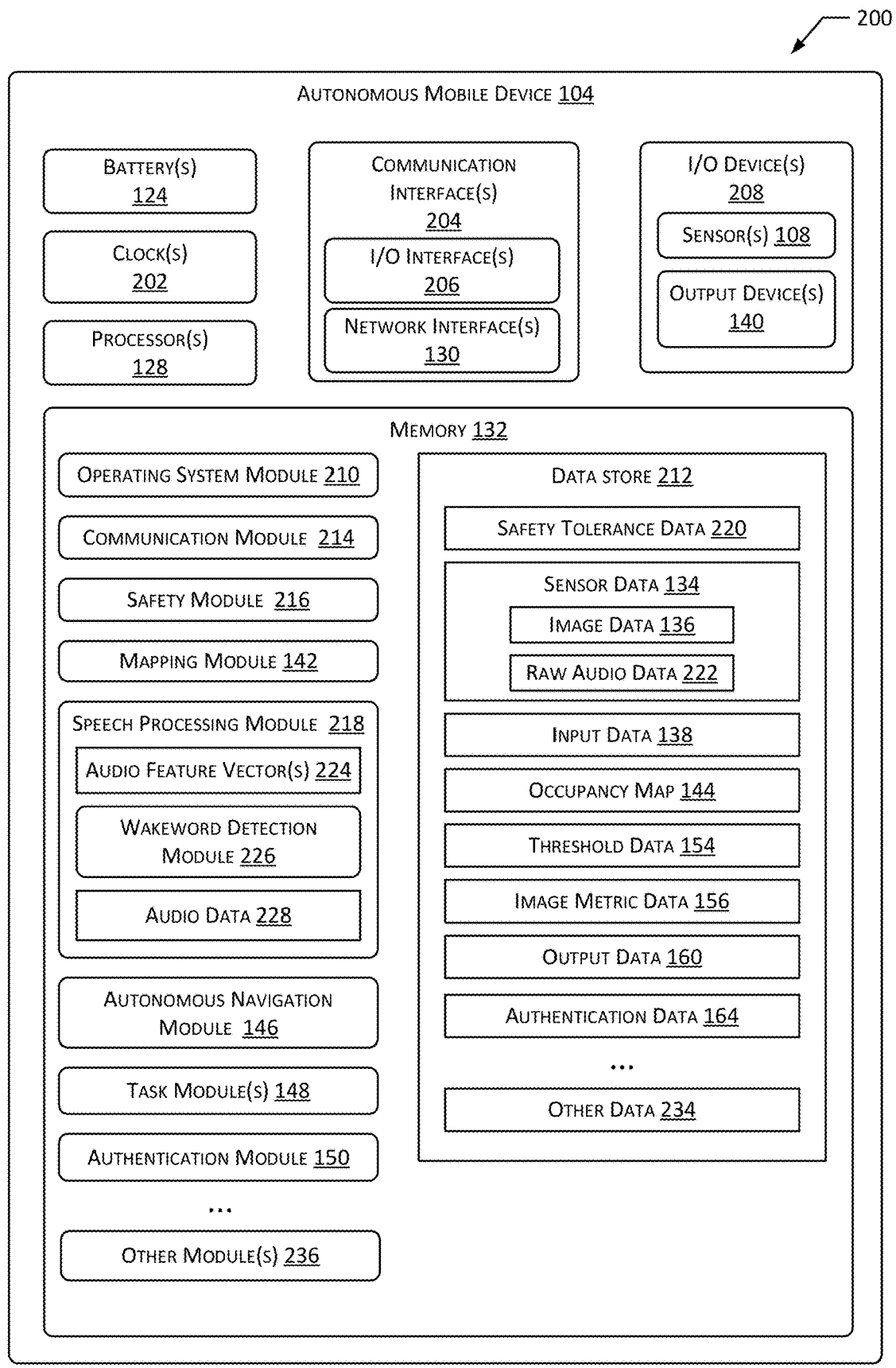
FIG. 2 is a block diagram of the components of the AMD, according to some implementations.

FIG. 2 is a block diagram 200 of the AMD 104, according to some implementations. The AMD 104 may include one or more batteries 124 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 128 may use data from the clock 202 to associate a particular time with an action, sensor data 134, and so forth.

The AMD 104 may include one or more hardware processors 128 (processors) configured to execute one or more stored instructions. The processors 128 may comprise one or more cores. The processors 128 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 130, and so forth. The communication interfaces 204 enable the AMD 104, or components thereof, to communicate with other devices 172 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 108, keyboard, mouse, scanner, and so forth. The I/O devices 208 may also include output devices 140 such as one or more of a motor 126, light, speaker, display, projector, printer, and so forth. In some embodiments, the I/O devices 208 may be physically incorporated with the AMD 104 or may be externally placed.

The network interfaces 130 may be configured to provide communications between the AMD 104 and other devices 172 such as other AMDs 104, docking stations 168, routers, access points, and so forth. The network interfaces 130 may include devices configured to couple to personal area networks (PANs), local area networks (LANs), wireless local area networks (WLANS), wide area networks (WANs), and so forth. For example, the network interfaces 130 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 132. The memory 132 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 132 provides storage of computer-readable instructions, data structures, program modules, and other data for the operation of the AMD 104. A few example functional modules are shown stored in the memory 132, although the same functionality may alternatively be implemented in hardware, firmware, or as a system on a chip (SoC).

The memory 132 may include at least one operating system (OS) module 210. The OS module 210 is configured to manage hardware resource devices such as the I/O interfaces 206, the I/O devices 208, the communication interfaces 204, and provide various services to applications or modules executing on the processors 128. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 132 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 172 including other AMDs 104, servers 170, network attached storage devices, and so forth.

A communication module 214 may be configured to establish communication with other devices 172, such as other AMDs 104, an external server 170, a docking station 168, and so forth. The communications may be authenticated, encrypted, and so forth.

Other modules within the memory 132 may include a safety module 216, the mapping module 142, the autonomous navigation module 146, the one or more task modules 148, a speech processing module 218, or other modules 236. The modules may access data stored within the data store 212, including safety tolerance data 220, sensor data 134, threshold data 154, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 108 detects an object has approached to less than the minimum distance, all movement of the AMD 104 may be stopped. Movement of the AMD 104 may be stopped by one or more of inhibiting operations of one or more of the motors 126, issuing a command to stop motor operation, disconnecting power from one or more the motors 126, and so forth. The safety module 216 may be implemented as hardware, software, or a combination thereof.

The safety module 216 may control other factors, such as a maximum speed of the AMD 104 based on information obtained by the sensors 108, precision and accuracy of the sensor data 134, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The speech processing module 218 may be used to process utterances of the user 112. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 166 in the form of output audio data. To prevent the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 170 for speech processing. The audio data 228 corresponding to audio obtained by the microphone may be processed locally on one or more of the processors 128, sent to a server 170 for routing to a recipient device or may be sent to the server 170 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 prior to sending to the server 170, and so forth.

The speech processing module 218 may include or access an automated speech recognition (ASR) module. The ASR module may accept as input raw audio data 222, audio feature vectors 224, or other sensor data 134 and so forth and may produce as output the input data 138 comprising a text string or other data representation. The input data 138 comprising the text string or other data representation may be processed to determine the command to be executed. For example, the utterance of the command "robot, come here" may result in input data 138 comprising the text string "come here". The wakeword "robot" may be omitted from the input data 138.

The autonomous navigation module 146 provides the AMD 104 with the ability to navigate within the physical space 102 without real-time human interaction. The autonomous navigation module 146 may implement, or operate in conjunction with, the mapping module 142 to determine the occupancy map 144, or other representation of the physical space 102. In one implementation, the mapping module 142 may use one or more simultaneous localization and mapping ("SLAM") techniques. The SLAM algorithms may utilize one or more of maps, algorithms, beacons, or other techniques to navigate. The autonomous navigation module 146 may use the occupancy map 144 to determine a set of possible paths along which the AMD 104 may move. One of these may be selected and used to determine path plan data indicative of a path. For example, a possible path that is the shortest or has the fewest turns may be selected and used to determine the path. The path is then subsequently used to determine a set of commands that drive the motors 126 connected to the wheels. For example, the autonomous navigation module 146 may determine the current location within the physical space 102 and determine a path plan that describes the path to a destination location such as the docking station 168.

The autonomous navigation module 146 may utilize various techniques during processing of sensor data 134. For example, an image 136 comprising data obtained from one or more cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 128, in response to a command received from one or more communication interfaces 204, as determined from the sensor data 134, and so forth. For example, an external server 170 may send a command that is received using the network interface 130. This command may direct the AMD 104 to proceed to find a particular user 112, follow a particular user 112, and so forth. The AMD 104 may then process this command and use the autonomous navigation module 146 to determine the directions and distances associated with carrying out the command. For example, the command to "come here" may result in a task module 148 sending a command to the autonomous navigation module 146 to move the AMD 104 to a particular location near the user and orient the AMD 104 in a particular direction.

The AMD 104 may connect to the network 166 using one or more of the network interfaces 130. In some implementations, one or more of the modules or other functions described here may execute on the processors 128 of the AMD 104, on the server 170, or a combination thereof. For example, one or more servers 170 may provide various functions, such as ASR, natural language understanding (NLU), providing content such as audio or video to the AMD 104, and so forth.

The other modules 236 may provide other functionality, such as object recognition, speech synthesis, user authentication, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for authentication of a particular user, and so forth.

Figure 3:
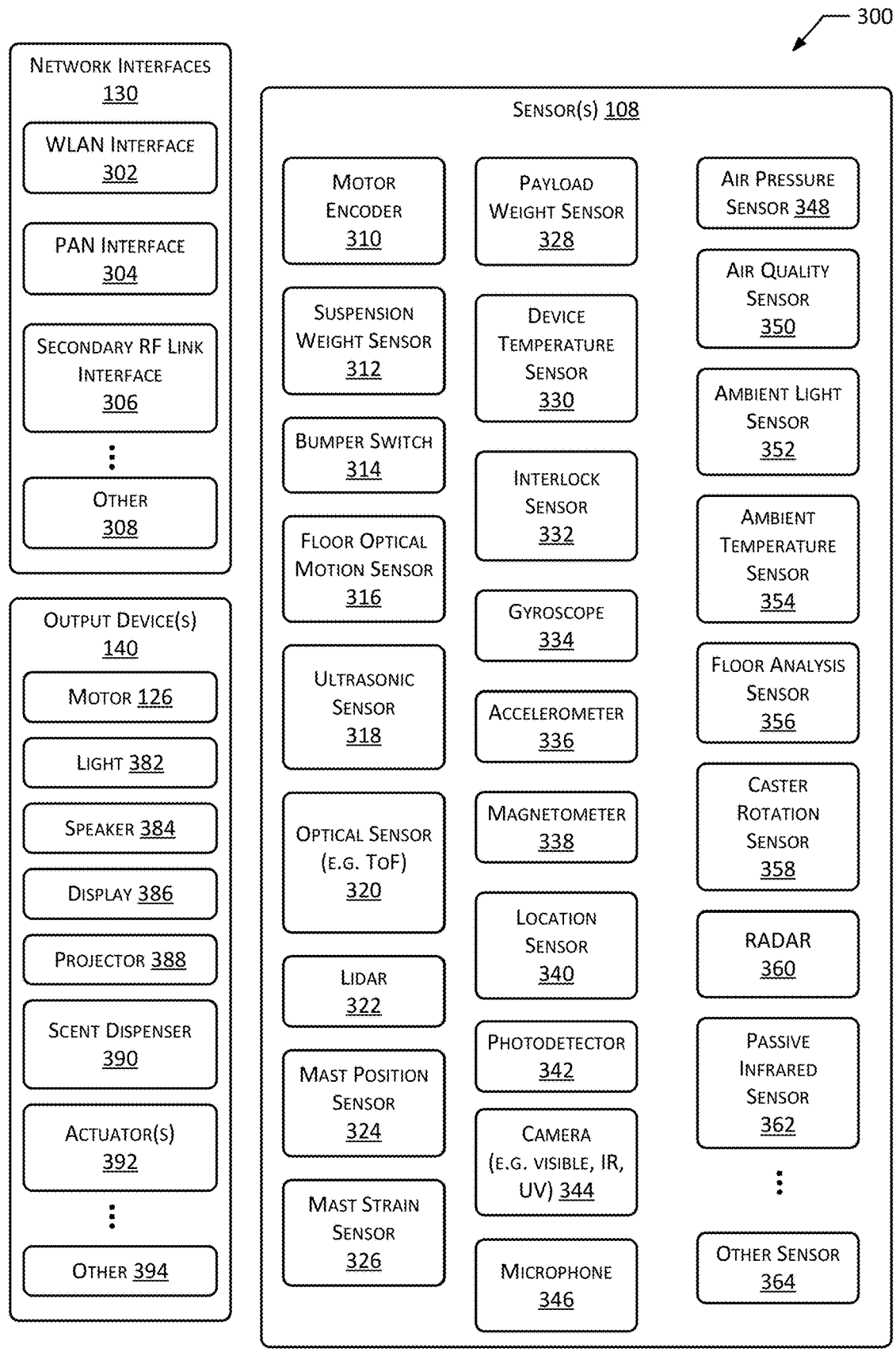
FIG. 3 is a block diagram of some components of the AMD, such as network interfaces, sensors, and output devices, according to some implementations.

FIG. 3 is a block diagram 300 of some components of the AMD 104 such as network interfaces 130, sensors 108, and output devices 140, according to some implementations. The components illustrated here are provided by way of illustration and not necessarily as a limitation. For example, the AMD 104 may utilize a subset of the particular network interfaces 130, output devices 140, or sensors 108 depicted here, or may utilize components not pictured. One or more of the sensors 108, output devices 140, or a combination thereof may be included on a moveable component that may be panned, tilted, rotated, or any combination thereof with respect to a chassis of the AMD 104.

The network interfaces 130 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 162 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 168, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 108. The sensors 108 depicted here are provided by way of illustration and not necessarily as a limitation. It is understood that other sensors 108 may be included or utilized by the AMD 104, while some sensors 108 may be omitted in some configurations.

A motor encoder 310 provides information indicative of the rotation or linear extension of a motor 126. The motor 126 may comprise a rotary motor, or a linear actuator. In some implementations, the motor encoder 310 may comprise a separate assembly such as a photodiode and encoder wheel that is affixed to the motor 126. In other implementations, the motor encoder 310 may comprise circuitry configured to drive the motor 126. For example, the autonomous navigation module 146 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 126. For example, if the suspension weight sensor 312 indicates no weight on the suspension, the implication is that the AMD 104 is no longer resting on its wheels, and thus operation of the motors 126 may be inhibited. In another example, if the suspension weight sensor 312 indicates weight that exceeds a threshold value, the implication is that something heavy is resting on the AMD 104 and thus operation of the motors 126 may be inhibited.

One or more bumper switches 314 provide an indication of physical contact between a bumper or other member that is in mechanical contact with the bumper switch 314. The safety module 216 utilizes sensor data 134 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motions of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 108 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 134 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10' FOV, allowing the sensor to have an overall FOV of 40'.

In another implementation, a structured light pattern may be provided by the optical emitter. A portion of the structured light pattern may then be detected on the object using a sensor 108 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 146 may utilize the sensor data 134 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 134 may be generated that is indicative of the presence of objects and the relative positions, shapes, and so forth that are visible to the lidar 322. Data from the lidar 322 may be used by various modules. For example, the autonomous navigation module 146 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 134 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 112, one or more motors 126, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 134 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 134 indicative of impinging light. For example, the photodetector 342 may provide data indicative of a color, intensity, duration, and so forth.

A camera 344 generates sensor data 134 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use one or more images 136 acquired by the camera 344 for object recognition, navigation, collision avoidance, user 112 communication, and so forth. For example, a pair of cameras 344 sensitive to infrared light may be mounted on the front of the AMD 104 to provide binocular stereo vision, with the sensor data 134 comprising images being sent to the autonomous navigation module 146. In another example, the camera 344 may comprise a 10 megapixel or greater camera that is used for videoconferencing or for acquiring pictures for the user 112.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 146 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users 112, determine of a direction of an utterance, determine ambient noise levels, for voice communication with another user 112 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 146, the task module 148, and so forth. For example, if the floor analysis sensor 356 determines that the floor is wet, the safety module 216 may decrease the speed of the AMD 104 and generate a notification alerting the user 112.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 108 may include a radar 360. The radar 360 may be used to provide information as to a distance, lateral position, and so forth, to an object.

The sensors 108 may include a passive infrared (PIR) sensor 362. The PIR 362 may be used to detect the presence of users 112, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 146. One or more touch sensors may be utilized to determine contact with a user 112 or other objects.

The AMD 104 may include one or more output devices 140. A motor 126 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 112. Continuing the example, a motor 126 with an eccentric weight may be used to create a buzz or vibration to allow the AMD 104 to simulate the purr of a cat.

Figure 4A:
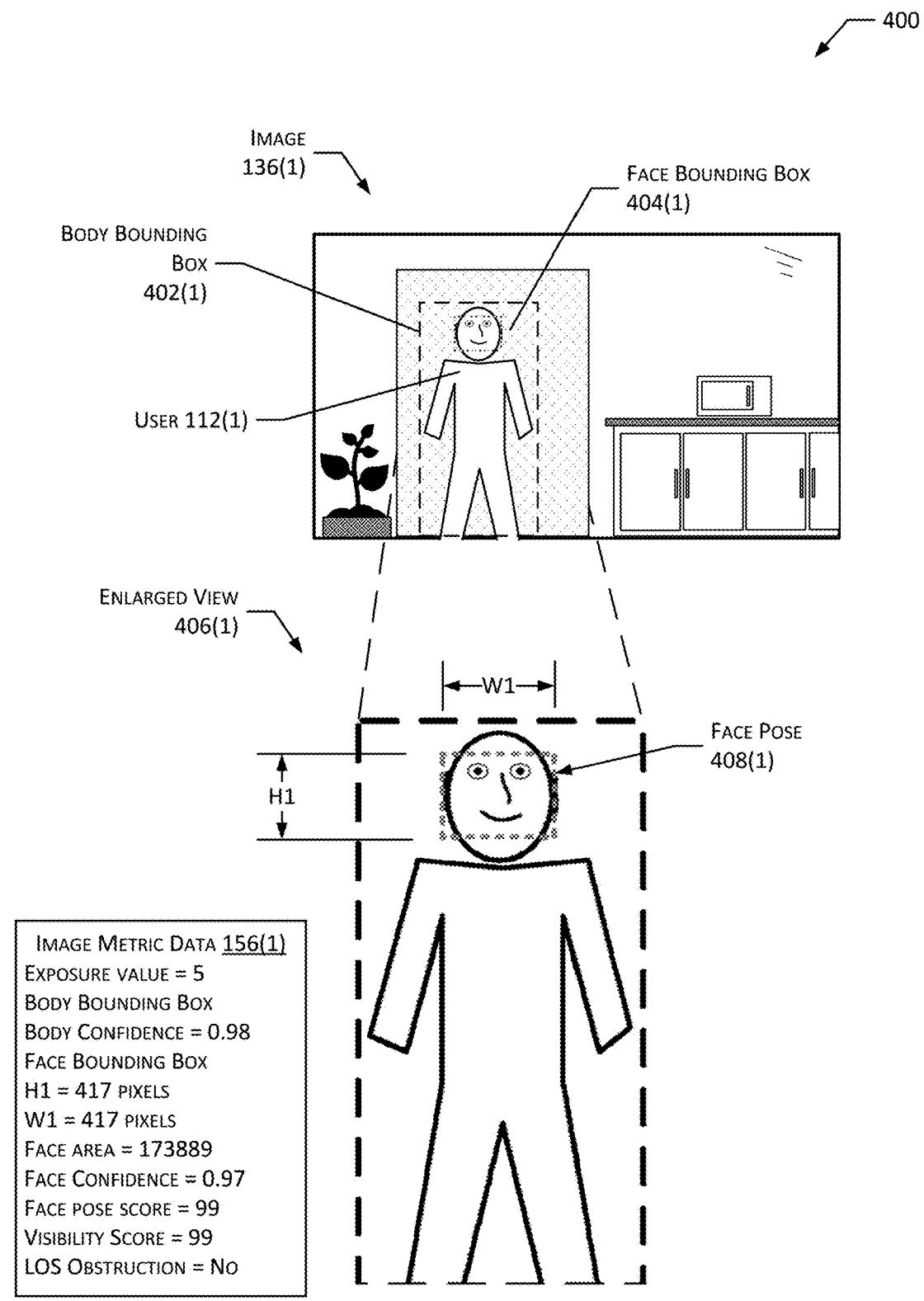
FIGS. 4A-4C depict multiple images, associated bounding boxes, and associated image metric data, according to some implementations.
Figure 4B:
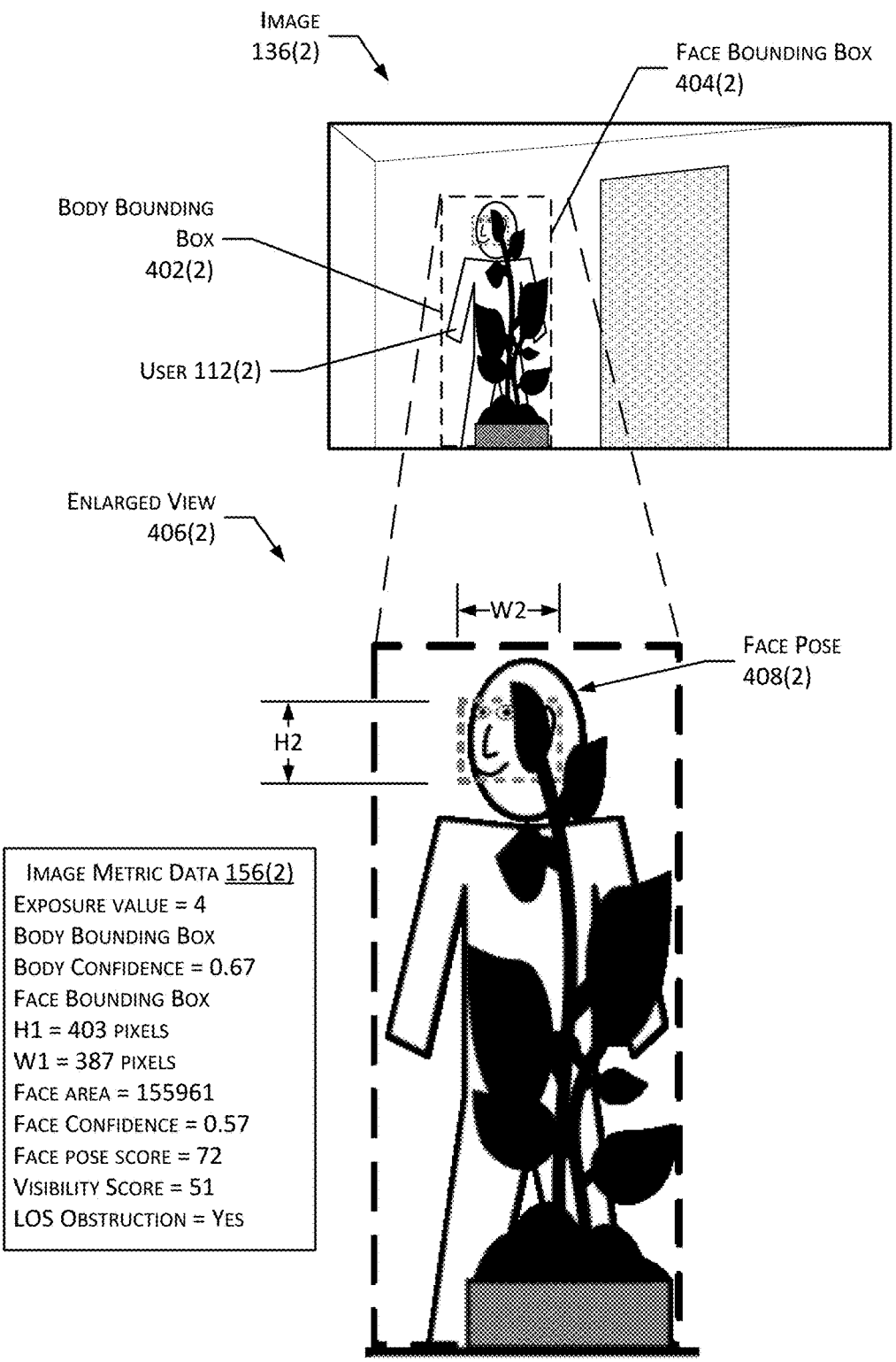
Figure 4C:
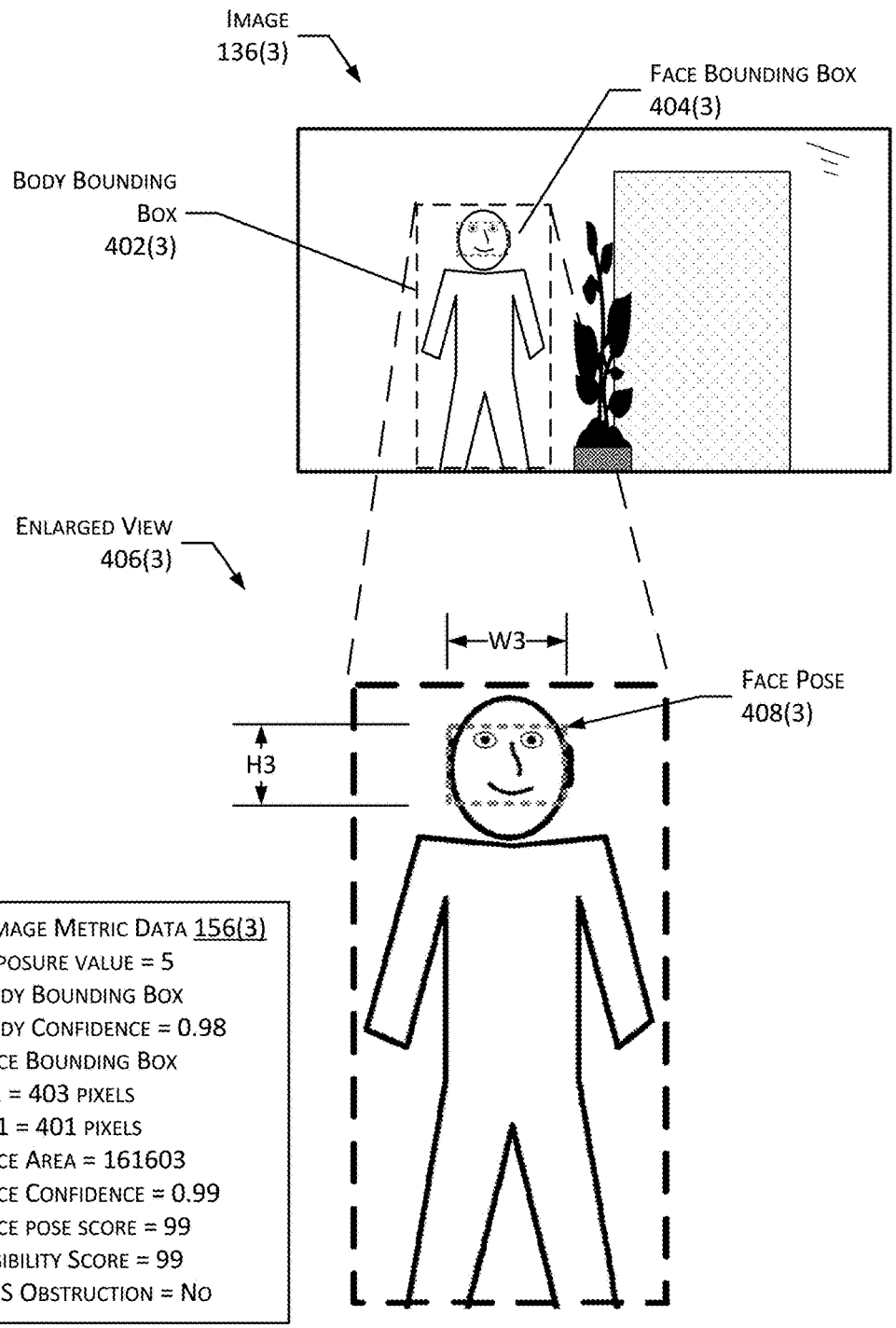

FIGS. 4A-4C depicts multiple images, associated bounding boxes, and associated image metric data 156, according to some implementations.

The image assessment module 152 may determine an exposure value. The exposure value is indicative of a luminosity of the image or a portion thereof. For example, the exposure value may comprise a determination of average luminosity of the image. The exposure value may be used to characterize if the image is under- or over-exposed.

An image assessment module 152 may include a neural network that has been trained to determine the presence of a human body in an image, as well as presence of a human face in the image. In one implementation, the neural network may be trained using gray scale images. The neural network may provide as output indicative of a body bounding box 402 and a face bounding box 404.

A body confidence value may be provided by the image assessment module 152 that is indicative of likelihood that the body bounding box 402 includes a body. A face confidence value may be provided by the image assessment module 152 that is indicative of a likelihood that the face bounding box 404 includes a face. The body bounding box 402 designates a portion of the image that is deemed to contain a human body. In some implementations the image assessment module 152 may also provide as output a visibility score. A body visibility score may be associated with the body bounding box 402. A face visibility score may be associated with the face bounding box 404.

The image assessment module 152 may also determine information about the bounding boxes. Each bounding box has a width and height as measured with respect to the image. The width and height may be expressed or measured as a number of pixels, percentage of image, and so forth. For example, the face bounding box 404(1) of an image in the image 136(1) may have a height H1 of 417 pixels and a width W1 of 417 pixels. A bounding box area associated with a bounding box may also be determined by multiplying the height and the width. For example, a face area may be determined by multiplying the height and width of the face bounding box 404.

In some implementations, the image assessment module 152 may provide as output information about keypoints that are depicted in the image. This information may include coordinates with respect to the image, tags indicative of the keypoint, count of keypoints, confidence values of keypoints, and so forth. Keypoints may be determined by the neural network that are associated with joints on the human body, facial features, and so forth. Keypoints may include one or more of body keypoints or face keypoints. For example, the neural network may determine the body keypoints such as a location in the image of a wrist, elbow, shoulder, and so forth. In another example, the neural network may determine the face keypoints such as a location in the image of an eye, mouth, nose, ear, and so forth.

The image assessment module 152 may determine face pose data. A face pose of a face depicted in an image is indicative of one or more of yaw, pitch, or roll of the face, relative to the image sensor or the camera 344. For example, the yaw and pitch of a face pose may be described as being relative to a line extending orthogonally from a plane of the face defined by the eyes and mouth relative to a line extending perpendicular to a plane of the image 136. Continuing the example, roll may be described as bring relative to a line extending from a midpoint between the eyes through a center of the mouth. In one implementation the face pose data may be indicative of an angle of one or more of yaw, pitch, or roll.

In another implementation, the face pose data may comprise data indicative of a relative pose. For example, a neural network may provide as an output face pose data that is indicative of the apparent pose of the face in the image and may be indicative of a relative pose such as "oriented left", "oriented right", "oriented up", "oriented down", or "towards camera".

The image assessment module 152 may also use information such as a current AMD location 106 associated with acquisition of the image 136, a user location 114 at the time of acquisition, and the occupancy map 144 to determine if there is a line-of-sight (LOS) obstruction. For example, with respect to the occupancy map 144, a sum of all obstacle values for cells in the occupancy map 144 between the AMD location 106 and the user location 114 may be summed. If the sum of obstacle values is less than a threshold value, no LOS obstruction may be deemed present. If greater than the threshold value, an LOS obstruction may be deemed present. In some implementations the portion of the occupancy map 144 considered in the determination may be a straight line, rectangle, or a triangle with vertices at the camera 344, left edge of the user 112 and right edge of the user 112. LOS obstruction and the occupancy map 144 are discussed with regard to FIG. 6.

The image assessment module 152 may determine a visibility score. The visibility score may be indicative of one or more bounding boxes. For example, a face visibility score may be indicative of visibility of a face within a face bounding box 404. In some implementations, the face visibility score may be determined by the neural network as output. In another implementation, the face visibility score may be based on other data. For example, the face visibility score may be based at least in part on one or more of a count of the number of face keypoints detected within the face bounding box 404, area of the face bounding box 404, face pose data, LOS obstruction information, and so forth. Continuing the example, one or more keypoints may be determined within the face bounding box 404 that are associated with a particular facial feature depicted in the image 136. Each keypoint may have an associated confidence value. In one implementation the face visibility score may comprise an average of the confidence values of the one or more keypoints within the face bounding box 404.

In other implementations, the image metric data 156 may include other information. For example, a blurriness value may be determined that is indicative of whether the image is in focus.

FIG. 4A depicts image 136(1) acquired by the AMD 104 at AMD location 106(1) of the user 112(1) at user location 114(1). Also depicted is the image metric data 156(1) associated with the image 136(1) and depictions of a body bounding box 402(1) and a face bounding box 404(1). In this image the face pose of the user 112(1) is directed directly at the camera 344.

FIG. 4B depicts image 136(2) acquired by the AMD 104 at AMD location 106(2) of the user 112(2) at user location 114(2). Also depicted is the image metric data 156(2) associated with the image 136(2) and depictions of a body bounding box 402(2) and a face bounding box 404(2). In this image, an obstacle 118 is in the line-of-sight between the AMD location 106(2) and the user location 114(2). The obstacle 118, a plant, obscures part of the user 112(2) in the image. In this image the face pose of the user 112(2) is to the right.

FIG. 4C depicts image 136(3) acquired by the AMD 104 at AMD location 106(3) of the user 112(2) at user location 114(2). To acquire this image 136(3), the AMD 104 has moved to the AMD location 106(3). Also depicted is the image metric data 156(3) associated with the image 136(3) and depictions of a body bounding box 402(3) and a face bounding box 404(3). In this image, the obstacle 118 is no longer in the line-of-sight between the AMD location 106(3) and the user location 114(2) and the view of the user 112(2) is unobstructed. Also, as a result of the movement of the AMD 102, the face pose of the user 112(2) is in the direction of the camera 344.

Figure 5A:
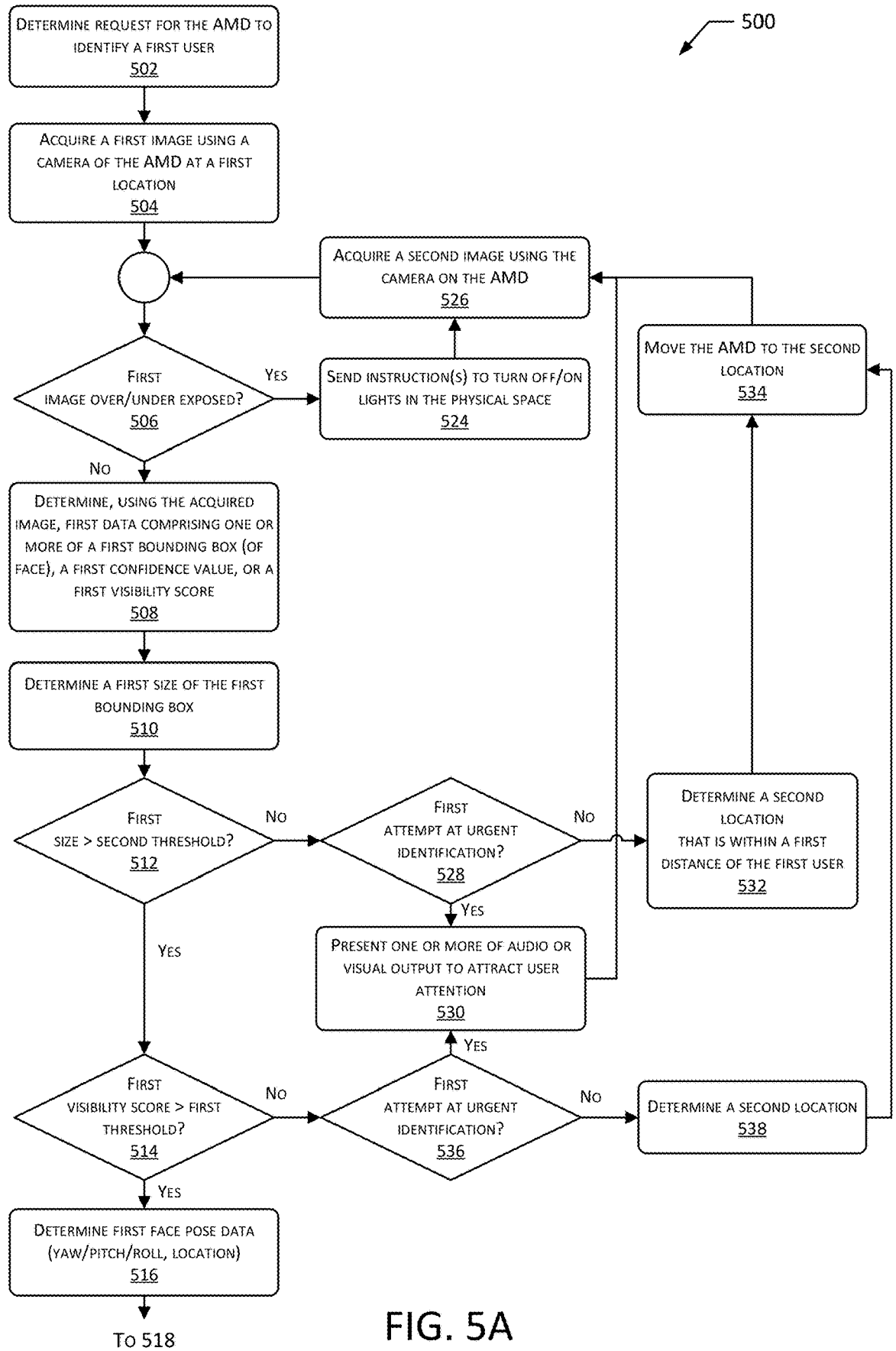
FIGS. 5A-5B is a flow diagram of a process for facilitating authentication of a user with an AMD, according to some implementations.
Figure 5B:
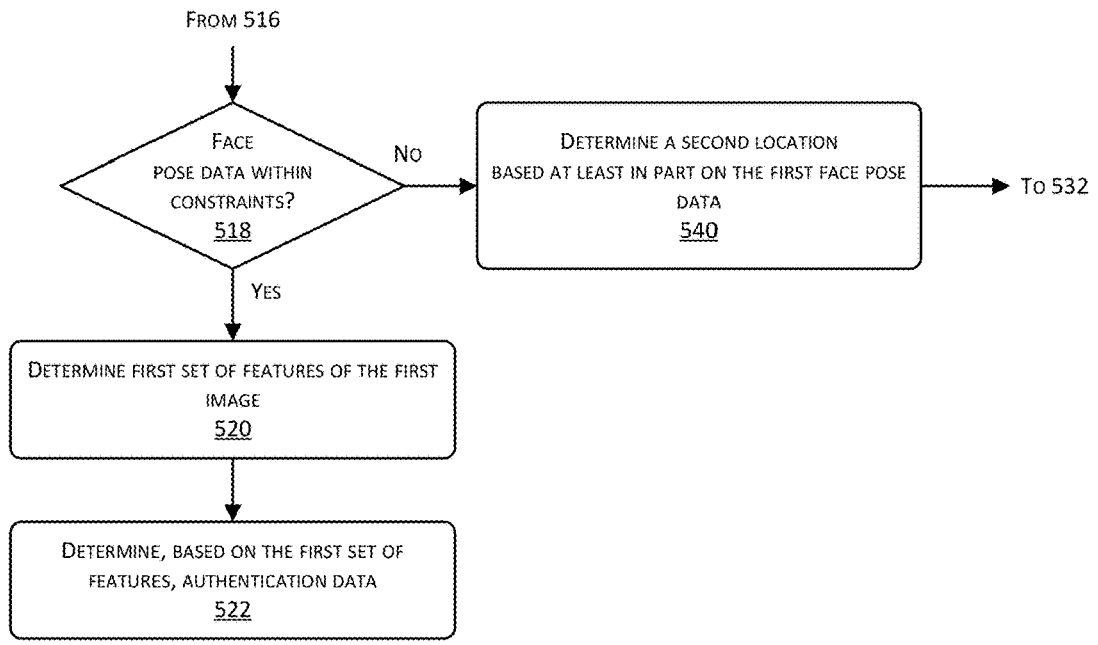

FIGS. 5A-5B are a flow diagram 500 of a process for facilitating image-based authentication with an AMD 104, according to some implementations. The process 500 may be performed by one or more of the AMD 104, the servers 170, or other devices 172. Suitability or unsuitability may be determined by comparing one or more values to one or more respective threshold values.

The overall process may include acquiring, at a first AMD location 106, a first image 136 at a first time using a camera 344 of the AMD 104. A first portion, such as the face bounding box 404 of the first image 136 is deemed to depict a face. If the first portion is deemed suitable for authentication, the analysis module 162 may process at least the first portion of the first image 136 to determine the authentication data 164. For example, if a value or metric associated with the first portion is greater than a first threshold value, the first portion may be deemed suitable for authentication.

If the first portion of the first image 136 is unsuitable to determine authentication data 164, the process may perform one or more actions. For example, if the value or metric associated with the first portion is less than the first threshold value, the first portion may be deemed unsuitable for authentication. During or after these actions, a second image 136 is acquired at a second time using the camera 344 of the AMD 104. A second portion of the second image 136 is determined, such as a second face bounding box 404 that depicts a face. If the second image 136 is deemed suitable, the analysis module 162 may process at least the second portion of the second image 136 to determine the authentication data 164.

At 502 a request is determined for the AMD 104 to authenticate a first user 112. For example, a task module 148 performing a "find user" task 122 may generate a request to authenticate the first user 112.

At 504 an image 136 is acquired at a first time using a camera 344 of the AMD 104 at a first AMD location 106(1).

At 506 the image assessment module 152 determines if the acquired image 136 is not over- or under-exposed. For example, the image assessment module 152 may determine image metric data 156 that includes an exposure value for the image 136. If the exposure value is less than a minimum threshold value or greater than a maximum threshold value the image 136 may be deemed unsuitably exposed and thus unsuitable and the process may proceed to 524. If the exposure value for the image 136 is within an exposure range designated by the minimum threshold value and the maximum threshold value, the image 136 may be deemed suitable and the process may proceed to 508.

At 508 the image assessment module 152 may determine, using the acquired image 136, additional image metric data 156. For example, the image assessment module 152 may determine the body bounding box 402, face bounding box 404, associated confidence values, a visibility score, face pose data, and so forth.

At 510 a first size of a first bounding box is determined. For example, the first size may comprise an area of the face bounding box 404. In another example, the first size may comprise one or more of the width or height of the face bounding box 404.

At 512 the image assessment module 152 may determine if the size of the first bounding box is greater than a first size threshold value. In some implementations this determination may be used to determine if the face bounding box 404 is large enough to be suitable for image-based authentication. For example, the analysis module 162 may be trained to recognize faces which occupy a minimum area of 300 by 300 pixels in an image 136. If the first size is greater than the first size threshold value, the image 136 may be deemed suitable and the process may proceed to 514.

At 514 the image assessment module 152 may determine if the visibility score(s) is greater than a first visibility threshold value. In some implementations this determination may be used to determine if the face bounding box 404 contains sufficient detail and is thus suitable for image-based authentication. If the visibility score is greater than the first visibility threshold value, the image 136 may be deemed suitable and the process may proceed to 510.

At 516 first face pose data may be determined. For example, first face pose data may be determined based on the first portion of the image 136 within the first bounding box. In one implementation the first face pose data may be indicative of one or more of a yaw, pitch, or roll with respect to the camera 344 of a head that is associated with the face. In another implementation, the face pose data may be indicative of a relative pose such as "oriented left", "oriented right", "oriented up", "oriented down", or "towards camera".

At 518 the image assessment module 152 determines if the face pose data is within constraints specified by the threshold data 154. For example, the analysis module 162 may be trained to recognize faces depicted in images where the face pose has a yaw within an angular range relative to the face of between −45 degrees left and +45 right. The constraints may be determined based on the operation of the analysis module 162. For example, the analysis module 162 may utilize a neural network which was trained using images obtained within a first range of yaw, second range of roll, third range of pitch, and so forth. An image 136 with a face pose that is within these ranges may be deemed suitable and the process may proceed to 520.

At 520 the analysis module 162 may process the image 136 to determine a first set of features. For example, a neural network may determine one or more feature vectors associated with the face depicted in the face bounding box 404 of the image 136.

At 522, based on the first set of features, the analysis module 162 determines authentication data 164. For example, if the one or more feature vectors match to within a threshold tolerance of previously stored feature vectors of an enrolled user 112, the authentication data 164 may indicate identity of the user 112 is that of the previously enrolled user 112. The authentication data 164 may be provided to a module, such as the module which requested the authentication.

Returning to 506, if the exposure value is less than a minimum threshold value or greater than a maximum threshold value the image 136 may be deemed unsuitable due to poor exposure and the process may proceed to 524. At 524 one or more instructions are sent to operate one or more lights in the physical space 102. For example, if the image 136 is underexposed and if the current time of day is during an interval specified as waking hours, the AMD 104 may send instructions to turn on a light switch to increase illumination in the room where the AMD 104 is present. The process may then proceed to 526 which then acquires the second image 136 while the illumination is operating. Continuing the example, once a second image 136 has been acquired and deemed suitable, a second instruction may be sent to restore the light switch to the previous setting.

At 526 a second image 136 is acquired using the camera 344 on the AMD 104. The process may then proceed to 506 and use the second image 136 for subsequent processing.

Returning to 512, if the size of the first bounding box is less than the first size threshold value, the image 136 is deemed unsuitable and the process may proceed to 528. At 528 a determination is made as to whether this is a first attempt at an urgent authentication. If yes, the process may proceed to 530. If no, the process may proceed to 532.

At 530, the authentication action module 158 may operate the AMD 104 to perform one or more actions to present one or more of an audible or visual output to attract attention. For example, the authentication action module 158 may generate output data 160 that is then presented by the output devices 140. For example, the output data 160 may direct the AMD 104 to present an audio output by presenting audio using a speaker 384, or present a visual output using light 382 or the display 386, and so forth. During or after completion of the presentation of output, the process may then proceed to 526, where the second image 136 is acquired. Because the output may attract the attention of the user 112, the second image 136 may be better suited for image-based authentication due to a change in face pose or other movement of the user 112.

At 532 the authentication action module 158 may determine a second AMD location 106 that is within a first distance of the user 112. For example, to have reached this point, the face bounding box 404 may have been deemed to be too small. To increase the relative size of the face bounding box 404 the AMD 104 may move closer to the user 112, increasing the angular size of the user 112 with respect to the camera 344 and the overall size of the depiction of the user 112 in subsequently acquired images 136. The process may then proceed to 534 where the AMD 104 moves to the second location that is closer to the user 112.

Instead of moving the AMD 104, in some implementations where the camera 344 is equipped with an optical or electronic zoom function, this function may be used. For example, the zoom may be used to acquire a second image 136 for which the portion of the scene associated with the face bounding box 404 may be enlarged and acquired.

Returning to 514, if the visibility score is less than the first visibility threshold value, the image 136 may be deemed unsuitable and the process may proceed to 536. At 536 a determination is made as to whether this is a first attempt at an urgent authentication. As described above, a task 122 may call for urgent authentication. For example, a task 122 to establish realtime communication between a caller and a particular user 112, such as a telephone call, may have a specified maximum time limit to try and establish communication of 30 seconds. Because of this time limit, the task 122 may request urgent authentication to minimize the delay in establishing the communication. If this is a first attempt at urgent authentication, the process may proceed to 530.

Returning to 536, if the determination is that this is not a first attempt at an urgent authentication, the process may proceed to 538. At 538 the authentication action module 158 may determine a second AMD location 106. For example, the occupancy map 144 and the current user location 114 may be used to determine a second AMD location 106 which is unoccupied by an obstacle 118 and from which the AMD 104 would have an unobstructed line-of-sight (LOS) to the user 112 and be within a threshold distance. In some implementations the determination of the second AMD location 106 may also be based at least in part on the facial view region 116 of the user 112. The process may then proceed to 534.

At 534 the AMD 104 moves to the second AMD location 106. For example, the autonomous navigation module 146 may determine a path from the current AMD location 106 to the second AMD location 106. The AMD 104 may then move along this path to the second AMD location 106. Once the AMD 104 arrives at the second AMD location 106, the process may proceed to 526.

Returning to 518, if the face pose data is not within the constraints, the image 136 is deemed unsuitable and the process may proceed to 540. At 540 the authentication action module 158 may determine a second AMD location 106 based at least in part on the first face pose data. In one implementation, the first face pose data may be used to determine the facial view region 116 and the occupancy map 144. The orientation of the user 112 may be determined based on the image 136 and a facial view region 116 may be determined based on that orientation. Orientation of the user 112 is discussed in more detail with regard to FIG. 7.

The facial view region 116, the occupancy map 144, and the sensor FOV 110 may be used to determine a second AMD location 106 at 538. For example, the second AMD location 106 is unoccupied by an obstacle 118, is within the facial view region 116, has an unobstructed LOS to the user location 114 of the user 112, and is within a threshold distance of the user location 114. The process may then proceed to 534.

Figure 6:
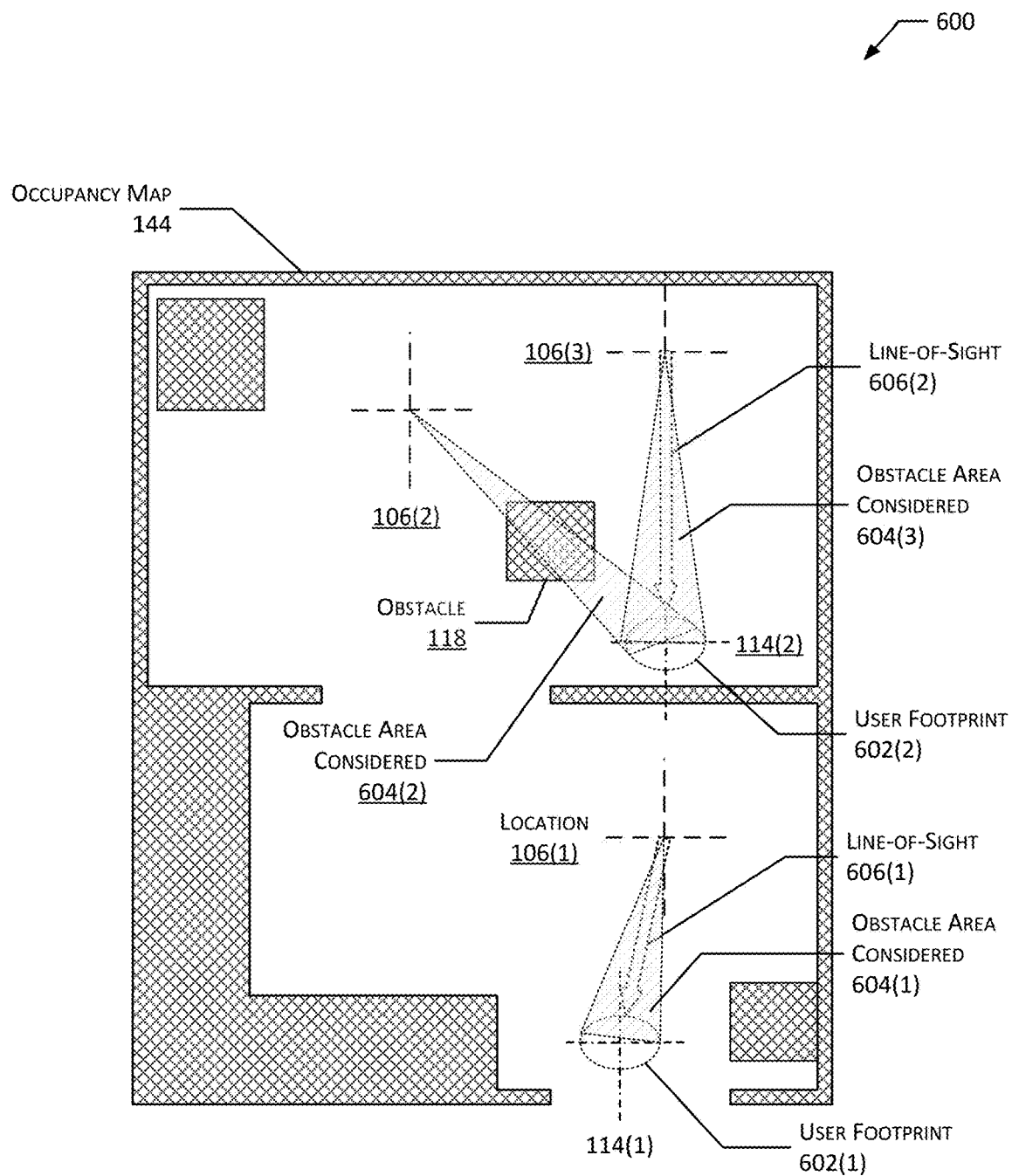
FIG. 6 depicts an occupancy map and line of sight between multiple locations, according to some implementations.

FIG. 6 depicts at 600 an occupancy map 144 and line-of-sight (LOS) between several locations, according to some implementations. The occupancy map 144 provides a representation of the physical space 102 including obstacles 118. In this illustration the AMD locations 106(1)-(3) and the user locations 114(1)-(2) are depicted. A first user footprint 602(1) associated with the first user 112(1) and a second user footprint 602(2) associated with the second user 112(2) are depicted. The user footprint 602 is indicative of an area within the occupancy map 144 that the user 112 has been determined to occupy.

An obstacle area considered 604 may extend from an AMD location 106 towards the user location 114. The obstacle area considered 604 may comprise the area between the camera 344 and the portion of the user 112 to be used for image-based authentication. In the implementation depicted here, the obstacle area considered 604 may comprise a triangular area having a first vertex at the AMD location 106, a second vertex at a first edge of the user footprint 602, and a third vertex at a second edge of the user footprint 602. In one implementation, the image 136 from a particular AMD location 106 may be deemed to be obstructed if a sum of obstacle values for the cells of the occupancy map 144 within the obstacle area considered 604 exceeds a threshold value.

A line-of-sight (LOS) 606 may be determined to be a straight line from one location to another, such as from an AMD location 106 to a user location 114. In one implementation, a LOS 606 may be deemed obstructed if a sum of obstacle values for the cells of the occupancy map 144 that are intersected by the LOS 606 exceed a threshold value.

Figure 7:
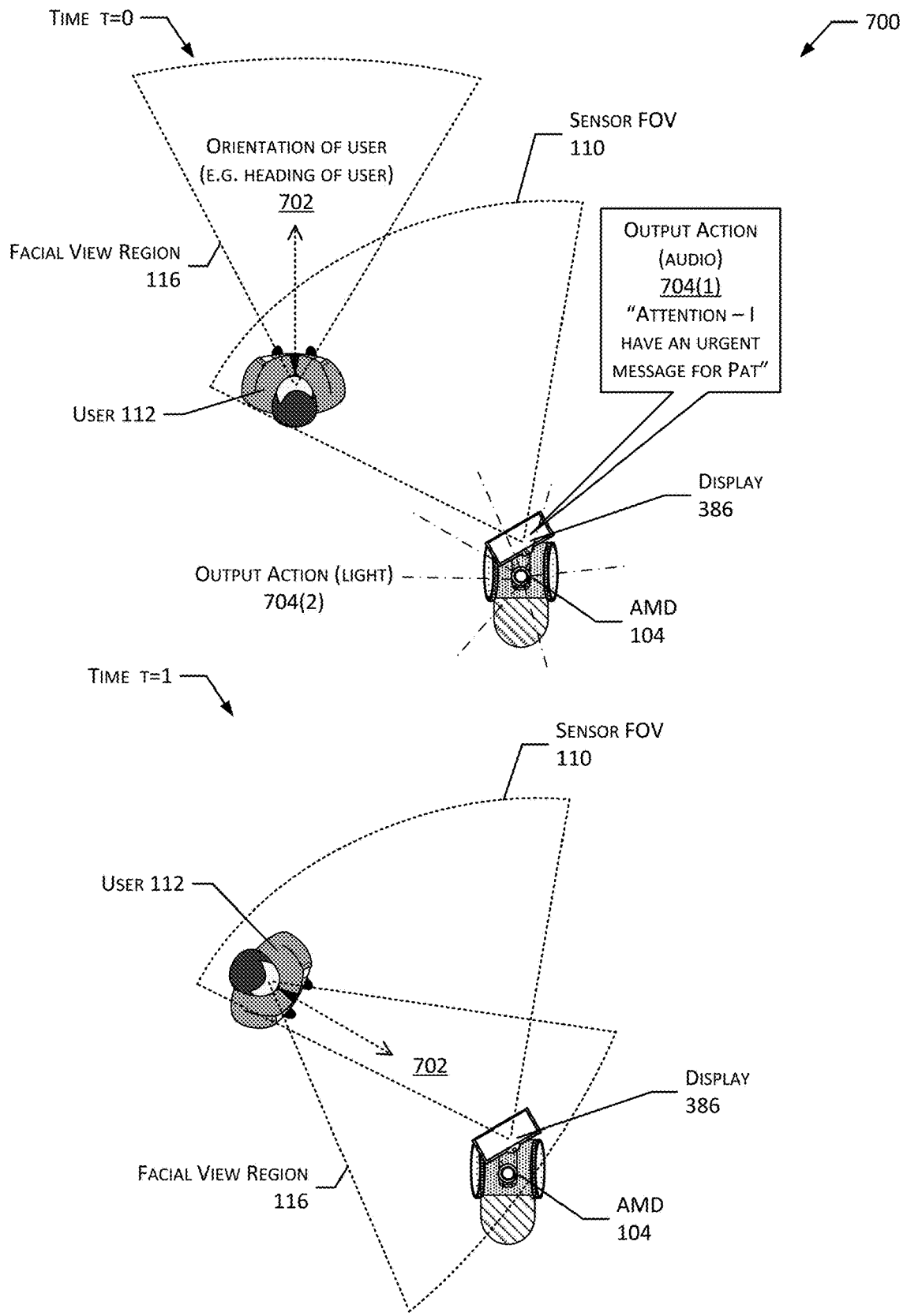
FIG. 7 depicts an AMD performing an output action to attract attention of a user to facilitate acquisition of an image for use in authenticating a user, according to some implementations.

FIG. 7 depicts a scenario 700 of an AMD 104 performing an output action to attract attention of a user 112 to facilitate acquisition of an image for image-based authentication, according to some implementations.

At time t=0 a user 112 is depicted with a facial view region 116 extending away from the face of the user 112 along an orientation of the user 702. In one implementation, the orientation of the user 702 may be indicative of an orientation of the head of the user 112. In another implementation, the orientation of the user 702 may be based on orientation of another portion of the user 112, such as the shoulders of the user 112.

At time t=0, the user 112 is within the sensor FOV 110 of the camera 344 of the AMD 104, but the orientation of the user 702 is away from the camera 344. In this implementation, the camera 344 is unable to acquire an image of the face of the user 112 suitable for image-based authentication. As described above, the AMD 104 may move to a second location that is within the facial view region 116 to obtain an image 136 suitable for use in image-based authentication. In some situations, an urgent task may require rapid authentication. To facilitate rapid authentication, the AMD 104 may perform an output action 704 that includes presenting output using one or more of the output devices 140. For example, the AMD 104 may present an audio output action 704(1) by presenting audio using a speaker 384. In another example, the AMD 104 may present a visual output action 704(2) by operating a light 382, presenting an image on the display 386, and so forth.

At time t=1, the attention of the user 112 has been attracted by the output action 704 and the user 112 has turned towards the AMD 104. As a result, the orientation of the user 702 is directed towards the camera 344 of the AMD 104. With the overlap between the sensor FOV 110 of the camera 344 and the facial view region 116, the image 136 acquired at or after time t=1 is more likely to be suitable for processing by the analysis module 162. In some implementations, the output action 704 may cease when authentication data 164 has been determined that is indicative of an authentication of a particular user 112 or determination that the user 112 is unknown.

By using the techniques described, the AMD 104 is able to more quickly and accurately authenticate users 112 based at least in part on an image. The AMD 104 is able to determine an unsuitable image 136 and affirmatively take one or more actions to acquire a suitable image and authenticate the user 112. This improves the operational security of the system, facilitating control of access to information and functions to intended individuals. By reducing the processing of unsuitable images computational efficiency is improved and also reduces power consumption, extending the battery life of the AMD. As a result, the operation of the AMD 104 is significantly improved.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
   a camera;
   an output device;
   one or more memories storing first computer-executable instructions; and
   one or more processors to execute the first computer-executable instructions to:
   determine an occupancy map indicative of one or more obstacles in a physical space;
   acquire, using the camera, a first image of a portion of the physical space at a first time at a first location in the physical space, wherein the first image comprises a plurality of pixels;
   determine a first portion of the first image, wherein the first portion depicts a face of a user;
   determine a first size of the first portion with respect to the plurality of pixels;
   determine the first size is less than a first threshold value;
   determine a second location of the user in the physical space;
   determine a first orientation of the user at the second location in the physical space that is indicative of a direction the user is facing;
   determine a third location in the physical space:
   that is unoccupied by an obstacle as indicated by the occupancy map;
   wherein a first distance between the third location and the second location is less than a second distance between the second location and the first location; and
   that is located within a first angular range relative to the face of the user;
   move the robot to the third location;
   acquire, using the camera, a second image at a second time at the third location;
   determine that a second portion of the second image depicts the face of the user;
   determine a second size of the second portion;

determine that the second size is greater than the first threshold value;
authenticate the user using the second portion of the second image; and
output, using the output device, information associated with the user.

2. The robot of claim 1, the one or more processors to further execute the first computer-executable instructions to:
determine a first plurality of facial features that are depicted within the first portion of the first image, wherein a confidence value is associated with each of the facial features;
determine a first visibility score of the first portion of the first image based at least in part on the confidence values associated with the first plurality of facial features; and
wherein the first computer-executable instructions to determine the third location are responsive to a determination that the first visibility score is less than a second threshold value.

3. A method performed at least in part by an autonomous mobile device (AMD), the method comprising:
acquiring, at a first location in a physical space, a first image at a first time using a camera of the AMD;
determining that a first portion of the first image depicts a face;
determining that a first value associated with the first portion is less than a first threshold value;
acquiring a second image at a second time using the camera of the AMD;
determining that a second portion of the second image depicts the face;
determining that a second value associated with the second portion is greater than the first threshold value;
determining authentication data of a user based at least in part on the second portion of the second image; and
presenting information associated with the user using an output device of the AMD.

4. The method of claim 3, wherein determining the first value comprises:
determining a first set of facial features that are associated with the first portion;
determining a first set of confidence values that are associated with the first set of facial features; and
determining the first value based on the first set of confidence values.

5. The method of claim 3, wherein the determining the first value comprises:
determining one or more of: (i) height of the first portion as measured in pixels, (ii) width of the first portion as measured in pixels, or (iii) an area of the first portion as measured in pixels.

6. The method of claim 3, further comprising:
determining the first value by processing the first portion with one or more neural networks, wherein the first value is indicative of one or more of a yaw, a pitch, or a roll of the first face in the first portion; and
wherein the determining that the first value is less than the first threshold value comprises one or more of: (i) determining the yaw is less than a second threshold value associated with suitability for the determining the authentication data of the user, (ii) the pitch is less than a third threshold value associated with suitability for the determining the authentication data of the user, or (iii) the roll is less than a fourth threshold value associated with suitability for the determining the authentication data of the user.

7. The method of claim 3, wherein the determining the first value comprises:
determining first face pose data based on the first portion of the first image, wherein the first face pose data is indicative of one or more of a yaw, a pitch, or a roll of the face with respect to the camera; and
the determining that the first value associated with the first portion is less than the first threshold value comprising one or more of: (i) the yaw exceeds a yaw threshold value that is associated with suitability for the determining the authentication data of the user, (ii) the pitch exceeds a pitch threshold value associated with suitability for the determining the authentication data of the user, or (iii) the roll exceeds a roll threshold value associated with suitability for the determining the authentication data of the user.

8. The method of claim 3, further comprising:
determining an occupancy map indicative of one or more obstacles in the physical space;
determining a second location in the physical space of the user associated with the first face; and
wherein the determining that the first value is less than the first threshold value includes determining, based on the occupancy map, that an obstacle is present between the first location and the second location.

9. The method of claim 3, further comprising:
determining an occupancy map indicative of one or more obstacles in the physical space;
determining a second location in the physical space of the user associated with the first face;
determining a third location based on the occupancy map, wherein the occupancy map indicates that no obstacles are present between the second location and the third location;
moving the AMD to the third location; and
wherein the second image is acquired at the third location.

10. The method of claim 3, further comprising:
determining a second location in the physical space of the user associated with the first face;
determining an occupancy map indicative of one or more obstacles in the physical space;
determining a third location that is within a first threshold distance of the second location and is indicated as being unoccupied by the occupancy map;
moving the AMD to the third location; and
wherein the second image is acquired at the third location.

11. The method of claim 3, wherein the first value is indicative of one or more of a yaw, pitch, or roll of the first face with respect to the camera; and the method further comprising:
determining, based on the first value, a second location such that a third value associated with the second location is within one or more of a first yaw range, a first pitch range, or a first roll range;
moving the AMD to the second location; and
wherein the second image is acquired at the second location.

12. The method of claim 3, further comprising:
moving the AMD to a second location; and
outputting one or more of an audible sound or visual data.

13. The method of claim 3, wherein the first value is indicative of exposure; and the method further comprising:
sending an instruction to operate, at a third time that is between the first time and the second time, a light source in the physical space that the AMD is within; and wherein the second image is acquired while the light source is operating to illuminate at least a portion of the physical space.

14. An autonomous mobile device (AMD) comprising:
a camera;
an output device;
one or more memories storing first computer-executable instructions; and
one or more processors to execute the first computer-executable instructions to:
acquire, at a first location, a first image at a first time using the camera;
determine that a first portion of the first image depicts a first face;
determine that a first value associated with the first portion is less than a first threshold value;
acquire a second image at a second time using the camera of the AMD;
determine that a second portion of the second image depicts the first face;
determine that a second value associated with the second portion is greater than the first threshold value;
determine authentication data of a user based at least in part on the second portion of the second image; and
present, using the output device, information associated with the user.

15. The AMD of claim 14, the one or more processors to further execute the first computer-executable instructions to:
determine a first set of facial features that are associated with the first portion;
determine a first set of confidence values that are associated with the first set of facial features; and
determine the first value based on the first set of confidence values.

16. The AMD of claim 14, the one or more processors to further execute the first computer-executable instructions to:
determine one or more image metrics associated with the first portion, the image metrics comprising one or more of height of the first portion as measured in pixels, width of the first portion as measured in pixels, or area of the first portion as measured in pixels; and
wherein the first value is based on the one or more image metrics.

17. The AMD of claim 14, the one or more processors to further execute the first computer-executable instructions to:
determine, using one or more neural networks, the first value that is indicative of one or more of a yaw, a pitch, or a roll of the face depicted in the first portion; and determine that the first value is less than the first threshold value using instructions to:
determine one or more of: (i) the yaw is less than a second threshold value associated with suitability for the determining the authentication data of the user, (ii) the pitch is less than a third threshold value associated with suitability for the determining the authentication data of the user, or (iii) the roll is less than a fourth threshold value associated with suitability for the determining the authentication data of the user.

18. The AMD of claim 14, the one or more processors to further execute the first computer-executable instructions to:
determine an occupancy map indicative of one or more obstacles in a physical space;
determine a second location in the physical space of the user associated with the face;
determine, that an obstacle is present between the first location and the second location; and
wherein the first value is less than the first threshold value based on the obstacle being present between the first location and the second location.

19. The AMD of claim 14, the one or more processors to further execute the first computer-executable instructions to:
determine an occupancy map indicative of one or more obstacles in a physical space;
determine a second location in the physical space of the user associated with the face;
determine a third location based on the occupancy map, wherein the occupancy map indicates that no obstacles are present between the second location and the third location;
move the AMD to the third location; and
wherein the second image is acquired at the third location.

20. The AMD of claim 14, wherein the first value is indicative of one or more of a yaw, a pitch, or a roll of the face with respect to the camera; and
the one or more processors to further execute the first computer-executable instructions to:
determine, based on the first value, a second location such that a third value associated with the second location is within one or more of a first yaw range, a first pitch range, or a first roll range;
move the AMD to the second location; and
wherein the second image is acquired at the second location.

* * * * *

UNITED STATES PATENT AND TRADEMARK OFFICE
CERTIFICATE OF CORRECTION

PATENT NO. : 11,422,568 B1
APPLICATION NO. : 16/680227
DATED : August 23, 2022
INVENTOR(S) : Jim Oommen Thomas et al.

It is certified that error appears in the above-identified patent and that said Letters Patent is hereby corrected as shown below:

In the Claims

Column 31, Claim 6, Line 57:
Currently reads: "a roll of the first face in the first portion; and"
Where it should read: --a roll of the face in the first portion; and--.

Column 32, Claim 8, Line 21:
Currently reads: "user associated with the first face; and"
Where it should read: --user associated with the face; and--.

Column 32, Claim 9, Line 30:
Currently reads: "user associated with the first face;"
Where it should read: --user associated with the face--.

Column 32, Claim 10, Line 39:
Currently reads: "user associated with the first face;"
Where it should read: --user associated with the face;--.

Column 32, Claim 11, Lines 48-49:
Currently read: "or roll of the first face with respect to"
Where they should read: --or roll of the face with respect to--.

Column 33, Claim 14, Line 14:
Currently reads: "a first face;"
Where it should read: --a face--.

Column 33, Claim 14, Line 20:
Currently reads: "depicts the first face;"
Where it should read: --depicts the face;--.

Signed and Sealed this
Eleventh Day of October, 2022

*Katherine Kelly Vidal*

Katherine Kelly Vidal
*Director of the United States Patent and Trademark Office*